(12) United States Patent
Mattsson

(10) Patent No.: US 8,990,019 B2
(45) Date of Patent: Mar. 24, 2015

(54) METHODS AND APPARATUS FOR RAPID DETERMINATION OF TARGET DEPTH AND TRANSVERSE RESISTANCE

(75) Inventor: Johan Mattsson, Trangsund (SE)

(73) Assignee: PGS Geophysical AS, Olso (NO)

( * ) Notice: Subject to any disclaimer, the term of this patent is extended or adjusted under 35 U.S.C. 154(b) by 459 days.

(21) Appl. No.: 13/307,640

(22) Filed: Nov. 30, 2011

(65) Prior Publication Data

US 2013/0138346 A1     May 30, 2013

(51) Int. Cl.
*G01V 3/00* (2006.01)
*G01P 13/00* (2006.01)

(52) U.S. Cl.
CPC ........................................ *G01V 3/00* (2006.01)
USPC .............................. 702/2; 324/348; 73/170.33

(58) Field of Classification Search
CPC ........... G01V 3/12; G01V 3/083; G01V 3/38; G01V 2003/086; G01V 1/28; G01V 2003/085
USPC .............. 702/2, 1, 14, 16, 127, 189; 324/323, 324/332, 334–335, 337, 344–345, 347–350, 324/354, 357, 365; 703/2, 5, 10; 73/170.32–170.33
See application file for complete search history.

(56) References Cited

U.S. PATENT DOCUMENTS

| | | | |
|---|---|---|---|
| 4,617,518 | A | 10/1986 | Srnka |
| 7,548,487 | B2 | 6/2009 | Barnes |
| 7,646,671 | B2 | 1/2010 | Pan et al. |
| 7,672,195 | B2 | 3/2010 | Barnes |
| 2007/0280047 | A1 | 12/2007 | MacGregor et al. |
| 2008/0136420 | A1 | 6/2008 | Velikhov |
| 2010/0065266 | A1 | 3/2010 | Wahrmund et al. |
| 2010/0171501 | A1* | 7/2010 | Alumbaugh et al. ......... 324/334 |

FOREIGN PATENT DOCUMENTS

CN        101004454 A       7/2007

OTHER PUBLICATIONS

Anderson et al., An Integrated Approach to Marine Electromagnetic Surveying Using a Towed Streamer and Source, May 2010, First Break vol. 28, EAGE, pp. 71-75.*

Brady et al., Electromagnetic Sounding for Hydrocarbons, Spring 2009, Oildfield Review, pp. 4-19.*

Peter Krylstedt, et al, "Numerical Modelling of Electromagnetic Frequency Sounding in Marine Environments: A Comparison of Local Optimisation Techniques," Marine Electromagnetic Conference (MARELEC) Conference Proceedings, Jun. 2001, Stockholm, Sweden.

Peter Krylstedt, et al, "A Sequential Approach to Inverse Modelling in Marine Electromagnetics: Recovering the Conductivity Profile from Measurements of the Electromagnetic Field," Marine Electromagnetic Conference (MARELEC) Conference Proceedings, Jun. 2001, Stockholm, Sweden.

(Continued)

*Primary Examiner* — Toan Le

(57) ABSTRACT

Disclosed are apparatus and methods for determining characteristics of a target region which is embedded in background material below a body of water. In accordance with one embodiment, a resistivity background is determined. In addition, characteristics of an electric dipole due to the target region are determined. A resistance for the target region is then computed using the characteristics of the electric dipole and the resistivity background. Other embodiments, aspects and features are also disclosed.

18 Claims, 8 Drawing Sheets

(56) References Cited

OTHER PUBLICATIONS

Johan Mattsson "An integral equation method for low frequency electromagnetic fields in three-dimensional marine environments", Dec. 2005, 15 pages, FOI-R-1838-SE ISSN 1650-1942 Systems Technology Technical report.

Steven Constable, "Ten years of marine CSEM for hydrocarbon exploration", Geophysics, Sep.-Oct. 2010, pp. 75A67-75A81, vol. 75, No. 5.

F. N. Kong, H. Westerdahl, S. Ellinsgrud, T. Eldesmo, S. Johansen, 'Seabed Logging': A possible direct hydrocarbon indicator for deepsea prospects using EM energy, May 13, 2002, Oil & Gas Journal, pp. 1-6, PennWell Corporation.

S. E. Johansen, H. E. F. Amundsen, T. Røsten, S. Ellingsrud, T. Eidesmo, A. H. Bhuyian, "Subsurface hydrocarbons detected by electromagnetic sounding", Mar. 2005, First Break, pp. 31-36, vol. 23.

Lars O. Løseth, Hans M. Pedersen, Bjørn Ursin, Lasse Amundsen, Svein Ellingsrud, "Low-frequency electromagnetic fields in applied geophysics: Waves or diffusion?", Jul.-Aug. 2006, Geophysics, pp. W29-W40, vol. 71, No. 4.

Rune Mittet, "High-order finite-difference simulations of marine CSEM surveys using a correspondence principle for wave and diffusion fields", Jan.-Feb. 2010, Geophysics, pp. F33-F50, vol. 75, No. 1.

European Patent Convention Search Report for Application No. 12195071.1, dated: Mar. 15, 2013.

Michael S. Zhdanov, Sheng Fang, and Gábor Húrsan, Electromagnetic Inversion Using Quasi-Linear Approximation, Geophysics, Sep.-Oct. 2000, pp. 1501-1513, vol. 65, No. 5.

Tuohy, Ben, Patent Examination Report No. 1, Dec. 2, 2013, IP Australia, Australian Government, Australia.

* cited by examiner

FIG. 4      400

METHODS AND APPARATUS FOR RAPID DETERMINATION OF TARGET DEPTH AND TRANSVERSE RESISTANCE

BACKGROUND

Electromagnetic geophysical surveying of the Earth's subsurface involves imparting an electric field or a magnetic field into subsurface Earth formations, such formations being below the sea floor in marine surveys, and measuring electric and/or magnetic fields by measuring voltage differences induced in electrodes, antennas and/or interrogating magnetometers disposed at the Earth's surface, or on or above the sea floor. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

Often, electromagnetic surveying includes imparting a substantially continuous, time varying electromagnetic field into the subsurface formations by passing time varying electric current through a transmitter antenna. The alternating current may have one or more selected discrete frequencies. Such surveying is known as frequency domain surveying. Another technique for electromagnetic surveying of subsurface Earth formations known in the art is transient electromagnetic surveying. Therein, direct current (DC) electric current passes through a transmitter at the Earth's surface (or near the sea floor). At a selected time, the electric current is switched off, switched on, or has its polarity changed, and induced voltages and/or magnetic fields are measured, typically with respect to time over a selected time interval, at the Earth's surface or water surface. Alternative switching techniques are possible.

The above methods have been adapted for use in marine environments. Cable-based sensors have been devised for detecting electric and/or magnetic field signals resulting from imparting electric and/or magnetic fields into formations below the bottom of a body of water. Systems with towed electromagnetic receivers have also been devised.

Note that the figures provided herewith are not necessarily to scale. They are provided for purposes of illustration to ease in the understanding of the presently-disclosed invention.

DETAILED DESCRIPTION

In electromagnetic surveying techniques, the resistivity of the sub-bottom structure may be determined from the time distribution of the induced voltages and/or magnetic fields. Conventional techniques, such as traditional two-and-a-half dimensional (2.5D) or three dimensional (3D) inversion, may be applied to obtain a resistivity map of the survey area. However, such conventional techniques for determining sub-bottom resistivity information from electromagnetic (EM) data are highly tedious and time consuming. After acquiring the EM data, it often takes many days to obtain a reliable resistivity map of the survey area.

It is, therefore, highly desirable to provide a more efficient EM data analysis technique to reduce the time lag between acquiring the EM data and obtaining useful sub-bottom resistivity information. The present disclosure provides an innovative technique for efficiently determining target depth and transverse resistance from data acquired by a towed EM system. Using this technique and currently-available computing apparatus, the target depth and transverse resistance may be determined in real time during the EM data acquisition from a survey area.

Figure 1:
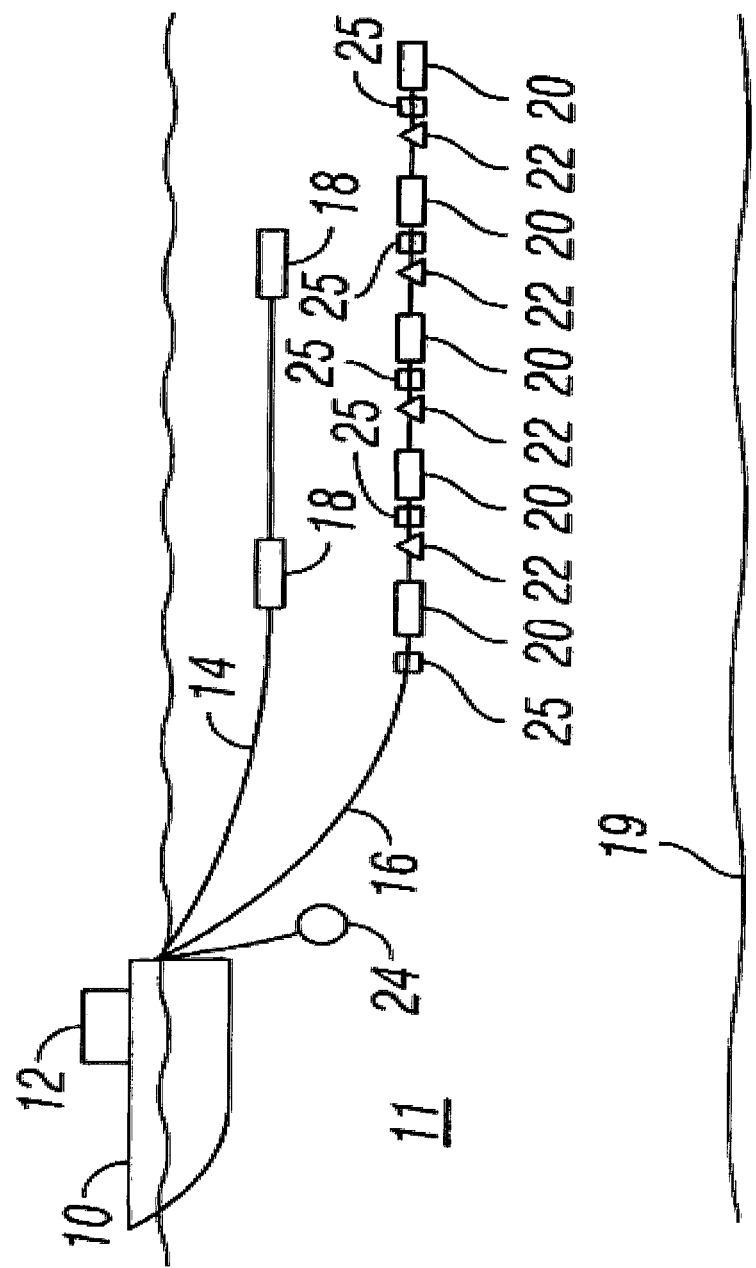
FIG. 1 shows an example marine electromagnetic survey system which may be used to acquire electromagnetic data in accordance with an embodiment of the invention.

FIG. 1 shows an example marine electromagnetic survey system which may be used to acquire EM data in accordance with an embodiment of the invention. As shown, a survey vessel 10 may move along the surface of a body of water 11, such as a lake, sea, or the ocean. The vessel 10 may include equipment, shown generally at 12 and referred to for convenience as a "recording system" that includes devices for applying electric current to an antenna such as source electrodes 18 and/or other devices disposed on or along a source cable 14 towed by the vessel 10. The recording system 12 may also include equipment for navigating the vessel 10, for determining the geodetic position of the vessel 10 and of components towed by the vessel 10 in the water 11, and for recording signals detected by one or more sensors on a sensor cable 16. As shown, the sensor cable 16 may also be towed by the vessel 10. In other embodiments, there may be multiple sensor cables 16, and the sensor cable(s) 16 may be towed by a second vessel (not shown).

The source cable 14 in the present example may include an antenna consisting of multiple (two are shown) source electrodes 18 disposed at spaced apart positions along the source cable 14. At selected times, certain of the equipment in the recording system 12 may conduct electric current across the source electrodes 18. The time varying component of such electric current produces an electromagnetic field that propagates through the water 11 and into the formations below the water bottom 19. The particular type of electrical current conducted across the source electrodes 18 may be a single or multiple discrete frequency alternating current as is used in frequency domain electromagnetic surveying, or various forms of switched direct current, as is used in transient electromagnetic surveying.

The arrangement of the source electrodes 18 shown in FIG. 1, referred to as a horizontal electric dipole antenna, is not the only type of electromagnetic transmitter antenna that may be used with the invention. The source cable 14 may also include, in addition to, or in substitution of, the horizontal electric dipole transmitter antenna shown in the figure, any one or more of a vertical electric dipole antenna, and horizontal or vertical magnetic dipole antenna (current loop). The horizontal dipole(s) may also be aligned broadside (perpendicular to the direction of towing).

In the illustrated example, the vessel 10 may also tow at least one sensor cable 16. The sensor cable 16 may include a plurality of electromagnetic sensors 20 at spaced apart positions along the sensor cable 16. Each of the electromagnetic sensors may measure a parameter related to the electromagnetic field resulting from interaction of the electromagnetic field induced by the transmitter (e.g., source electrodes 18) with the subsurface formations below the water bottom 19. In the present example, the electromagnetic sensors may be a pair of receiver electrodes disposed at spaced apart positions along the sensor cable 16. An electric field component of the electromagnetic field resulting from interaction of the induced electromagnetic field with the formations below the water bottom 19 may induce voltages across each of the pairs of receiver electrodes, and such voltages may be detected by a voltage measuring circuit. Such voltage measuring circuits may be disposed in the sensor cable 16 and/or in the recording system 12. Another example of an electromagnetic sensor that may be used in other embodiments is a single axis or multi-axis magnetometer, such as a flux gate magnetometer.

The sensor cable 16 in some examples may also include seismic sensors, such as hydrophones and/or geophones, shown generally at 22, disposed at spaced apart locations along the sensor cable 16. For such examples where the sensor cable 16 includes seismic sensors, the survey vessel 10 or another vessel may tow a seismic energy source 24, such as an air gun or array of air guns. The seismic energy source 24 may be actuated at selected times by certain equipment in the recording system 12 and signals detected by the seismic sensors 22 may be recorded by a signal recording device in the recording system 12. During survey operations, seismic signals may be acquired substantially contemporaneously with electromagnetic signals detected by the electromagnetic sensor 20 or may be acquired at other times.

It should be understood that the example system in the figure including only one sensor cable 16 is shown to illustrate how to make and use a sensor cable according to various aspects of the invention. Such a sensor cable may be used in acquisition systems that include a plurality of laterally spaced apart sensors cables towed by the survey vessel 10, and/or by another vessel, in a selected configuration to provide "in line" and "cross line" electromagnetic and/or seismic signals.

Figure 2:
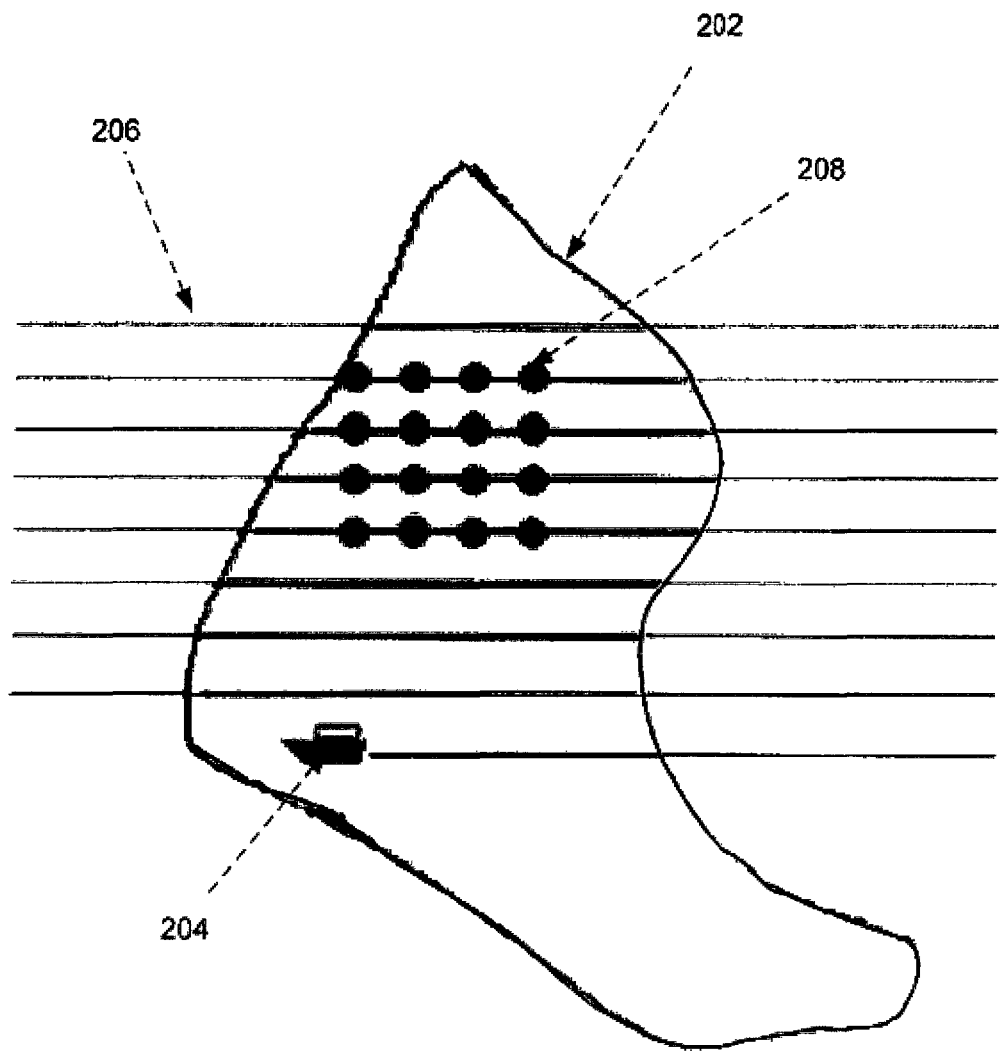
FIG. 2 shows a top view of a set of survey lines over a region with a resistive anomaly in accordance with an embodiment of the invention.

FIG. 2 is a top view of an example region of interest of a body of water with a sub-bottom resistive anomaly 202 (within the outline shown). A survey vessel 204 may travel along survey lines 206 which cross the region of interest. The survey vessel 204 may be configured to perform a towed EM survey. In one embodiment, the survey vessel 204 may be configured as shown in FIG. 1 and described above. Further depicted in FIG. 2 is a set of common midpoints (cmps) 208 along the survey lines 206.

Figure 3:
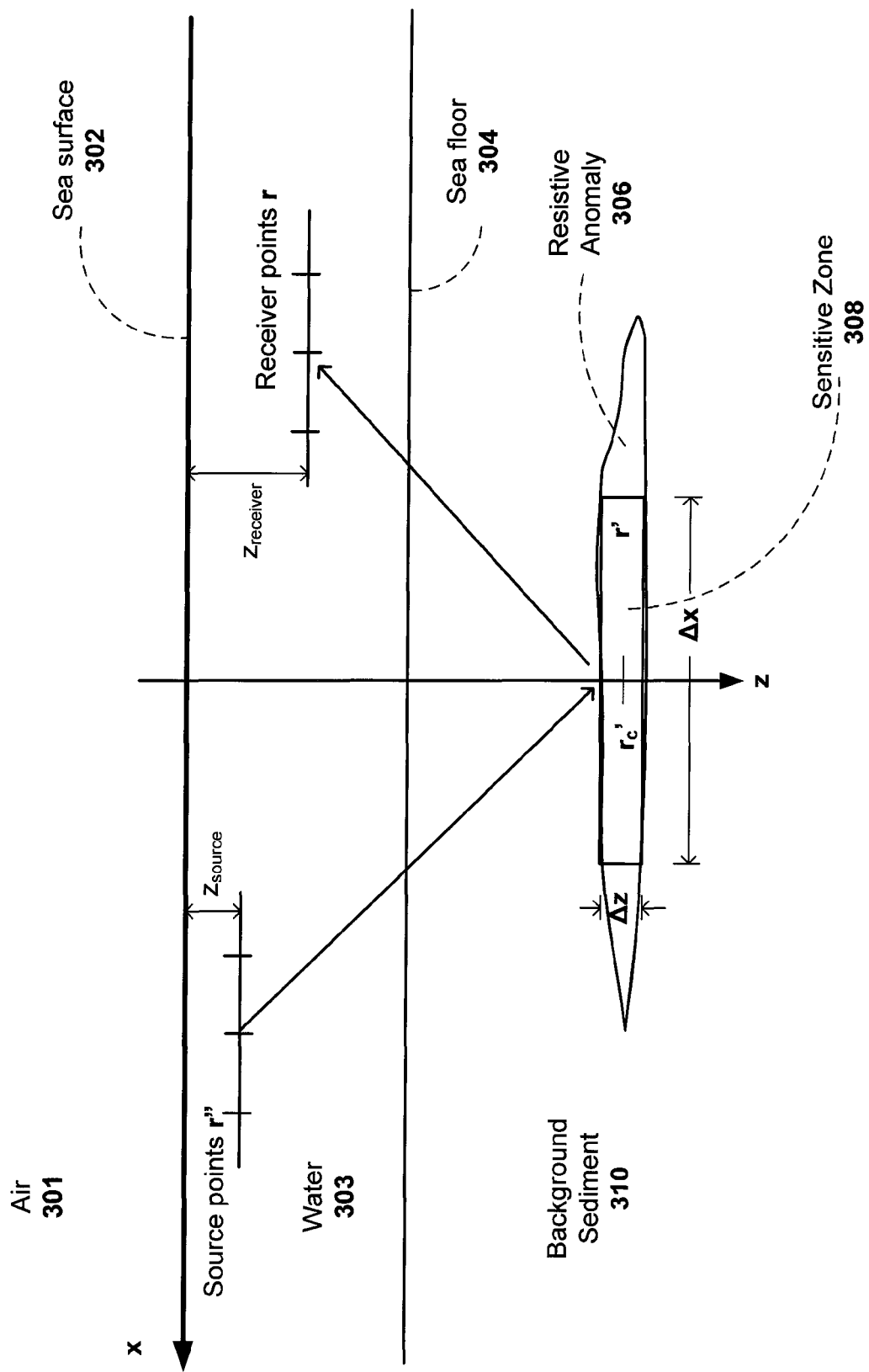
FIG. 3 is a cross-sectional diagram showing the EM surveying geometry at one common midpoint in accordance with an embodiment of the invention.

The EM surveying geometry at a cmp 208 is shown in the cross-sectional diagram in FIG. 3. Note that the diagram in FIG. 3 is for illustrative purposes and is not necessarily to scale.

In FIG. 3, the sea (or lake or ocean) surface 302 and the sea (or lake or ocean) floor 304 are depicted as horizontal lines. There is, of course, air 301 above the sea surface 302, and water 303 between the sea surface 302 and the sea floor 304. The x-axis is defined as a horizontal line along a survey line 206 on the sea surface 302, and the z-axis is defined as a vertical line going through the cmp 208.

As further shown, there are spaced apart source points r'' below the x-axis at a depth $z_{source}$ in the water 303. In addition, there are spaced apart receiver points r below the x-axis at a depth $z_{receiver}$ in the water 303. For example, the depth $z_{source}$ may be 10 meters deep, and the depth $z_{receiver}$ may be within a range of 8 to 100 meters deep. Other depths may be used for one or more of the source and receiver points, depending on the implementation of the EM survey. Each source point r'' may represent an EM source location, such as a location of a source electrode 18 as described above. Each receiver point r may represent the location of an EM receiver device, such as the location of an electromagnetic sensor 20.

In this example, the cross section of a resistive anomaly (also referred to as the resistive region, anomaly region, or target region) 306 within background sediment 310 beneath the sea floor 304 is depicted (within the outline shown). In accordance with an embodiment of the invention, a sensitive zone 308 is defined as a rectangular box within the resistive anomaly 306 is used as a simplified approximation of the resistive anomaly 306.

Figure 4:
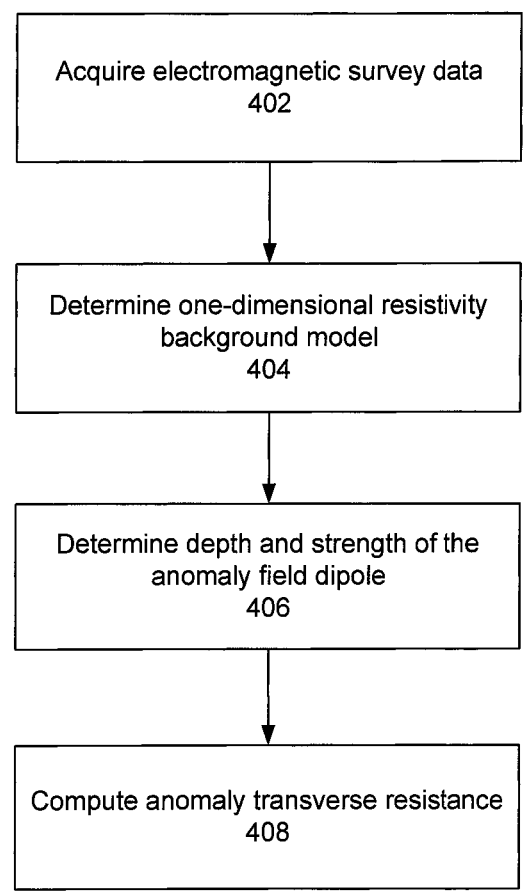
FIG. 4 is a flow chart of a method of real-time target depth and transverse resistance estimation in accordance with an embodiment of the invention.

FIG. 4 is a flow chart of a method 400 of real-time target depth and transverse resistance estimation in accordance with an embodiment of the invention. The method 400 includes acquiring 402 EM receiver data from at least one common midpoint (cmp). The geometry for the EM data acquisition from the cmp may be as described above in relation to FIG. 3.

Determining the Resistivity Background Model

To analyze the data efficiently, according to an embodiment of the invention, a determination 404 may be made as to a one-dimensional resistivity background model. The one-dimensional resistivity background model refers to a simplified model for the resistivity of the water 303 above the sea floor 304 and the background sediment 310 surrounding the targeted resistivity anomaly 306 (or surrounding the sensitive zone 308 in the simplified model of the anomaly).

The background model is one-dimensional in that the resistivity varies as a function of depth z while not varying laterally in x and y within the air 301, water 303, or background sediment 310. In one embodiment, the one-dimensional resistivity background model may assume a first resistivity level for the water 303 above the sea floor 304, a second resistivity level for the horizontal resistivity of the background sediment 310, and a third resistivity level for the vertical resistivity of the background sediment 310. A specific example of such a one-dimensional resistivity background model is described below in relation to FIG. 6.

In accordance with an embodiment of the invention, the one-dimensional resistivity background model may be determined 404 by a non-linear minimization procedure. In one implementation, the objective function to be minimized may be given by:

$$F_{1D\ bg\ inversion} = \sum_{l=1}^{N} \left| \frac{E_l^{bg} - E_l^{mea}}{|E_l^{mea}|} \right|^2 \quad (1)$$

where $E_l^{bg}$ is the calculated response field with a 1D background model, and $E_l^{mea}$ is the measured response field. The objective function in Equation (1) may be summed over both several frequencies and offsets at a cmp outside the high resistive region. A gradient-based interior point procedure may be used to minimize the objective function of Equation (1). In other words, the objective function in Equation (1) includes a difference between a calculated electric field response based on the one-dimensional resistivity background model and a measured electric field response for a cmp that is outside (i.e. not above) the sub-bottom resistive region. This background inversion procedure results advantageously in a stable and unique solution of the background resistivity profile.

Determining the Dipole

Using the one-dimensional resistivity background model, a determination 406 may then be made of the depth and strength of the dipole of the targeted anomaly region 306. This determination 406 may be based upon the following formulation.

The frequency-dependent response field $E(r,\omega)$ may be formulated as the sum of a background response field $E^{bg}(r,\omega)$ and the change in the background response field due to the resistive region (anomaly). This is shown in Equation (2):

$$E(r, \omega) = \qquad (2)$$
$$E^{bg}(r, \omega) + \int_{anomaly} G_e(r, r', \omega) \cdot ((\sigma(r') - \sigma^{bg}(r')) \cdot E(r', \omega)) dV(r')$$

where $G_e(r,r',\omega)$ is the Green's function of the background. The electric conductivity in the anomaly is $\sigma(r')$ and in the background $\sigma^{bg}(r')$. Hence, the conductivity change is given within Equation (2). In accordance with an embodiment of the invention, the towed EM surveying system only measures the x-component (in-line) of the electric field response which approximately reduces the expression in Equation (2) to:

$$E_x(r, \omega) \approx E_x^{bg}(r, \omega) + \qquad (3)$$
$$\int_{anomaly} G_{exx}(r, r', \omega) E_x(r', \omega)(\sigma_h(r') - \sigma_h^{bg}(r')) dV(r')$$

A vertical cross section at an arbitrary cmp may be as shown in the example depicted in FIG. 3 and described above. In accordance with FIG. 3, the sensitive zone 308 of the resistive anomaly 306 for the data from this cmp may be approximated as a box of size $(\Delta x, \Delta y, \Delta z)$. Applicant has determined numerically that the Green's function and the electric field $E_x(r',\omega)$ in Equation (3) are fairly constant within the box of the sensitive zone 308 provided that the sensitive zone 308 is sufficiently deep underneath the sea bottom (mud line) 304. Hence, given a sensitive zone 308 sufficiently deep below the sea bottom 304, the following expression has been determined to be a reasonably good approximation for the electric field of the frequency response:

$$E_x(r,\omega) \approx E_x^{bg}(r,\omega) + E_x^{anomaly}(r,\omega) \qquad (4)$$

$E_x^{anomaly}(r,\omega)$ in Equation (4) is the anomaly response field and represents the change in the response field (compared to the background response field $E_x^{bg}(r,\omega)$) which due to the anomaly region embedded in the background material.

In accordance with an embodiment of the invention, the anomaly response field $E_x^{anomaly}(r,\omega)$ may be approximated by the response field $E_x^{Idl}(r,\omega)$ due to an electric dipole at $r_c'$, where $r_c'$ is a location along the z-axis at a depth at the center of the vertical extent of the sensitive zone 308. Hence, the change in the response field that is due to the resistive anomaly may be approximated as follows:

$$E_x^{anomaly}(r,\omega) \approx E_x^{Idl}(r,\omega) = (-G_{exx}(r,r_c',\omega) \arg(E_x(r_c', \omega))) Idl(r_c',\omega) \qquad (5)$$

where the dipole strength $Idl(r_c',\omega)$ is given by:

$$Idl(r_c',\omega) = |E_x(r_c',\omega)|(\sigma_h^{bg}(r_c') - \sigma_h(r_c'))\Delta x \Delta y \Delta z \qquad (6)$$

As shown above, the dipole strength $Idl(r_c',\omega)$ is the product of the box volume $\Delta x \Delta y \Delta z$ of the sensitive zone 308, the magnitude of the x-component of the response field due to the dipole at $r_c'$, and the change in horizontal conductivity from the sensitive zone 308 to the background sediment 310. The dipole strength $Idl(r_c',\omega)$ is positive for resistive anomalies (with lower conductivity than the background).

In accordance with an embodiment of the invention, the depth and strength of the dipole may be determined 406 by a non-linear minimization procedure. In one implementation, the objective function to be minimized may be given by:

$$F_{dipole\ inversion} = \sum_{l=1}^{N} \left( \frac{|E_l^{bg} + E_l^{dip}| - |E_l^{mea}|}{|E_l^{mea}|} \right)^2 \qquad (7)$$

where $E_l^{bg}$ is the calculated response field with a 1D background model, $E_l^{dip}$ is the calculated response field due to the dipole, and the measured response field is denoted as $E_l^{mea}$. For this dipole inversion procedure, the lowest sensitive frequency may be used for a sensitive set of offsets at every cmp, and a gradient-based interior point procedure may be used to minimize the objective function of Equation (7).

Computing the Transverse Resistance of the Anomaly

After determining 406 the dipole depth and strength, the transverse resistance of the anomaly may be computed 408 based on the following formulation. From Ohm's law and the fact that the electric current density is approximately unchanged when flowing from the background material into the anomaly material results in:

$$|E_x(r_c', \omega)| \approx \frac{\sigma_h^{bg}(r_c')}{\sigma_h(r_c')} |E_x^{bg}(r_c', \omega)| \qquad (8)$$

Equation (8) gives a linear relation between the strength of the background response field (the response field without the anomaly) and the strength of the response field with the anomaly present. The resistivity in the sensitive zone 308 may then be written as:

$$\rho_h(r_c') \approx \frac{Idl(r_c', \omega) + \sigma_h^{bg}(r_c')|E_x^{bg}(r_c', \omega)|\Delta x \Delta y \Delta z}{(\sigma_h^{bg}(r_c'))^2 |E_x^{bg}(r_c', \omega)|\Delta x \Delta y \Delta z} \qquad (9)$$

Applicant has determined that the second term in the numerator may be neglected for typical values of background and anomaly conductivities. Hence, the anomaly transverse resistance $\rho_h(r_c')\Delta z$, defined in this approximation as the resistivity of the anomaly material $\rho_h(r_c')$ multiplied by the vertical extent (height) $\Delta z$ of the sensitive zone 308, may be approximated as:

$$\rho_h(r_c')\Delta z \approx \frac{Idl(r_c', \omega)}{|E_x^{bg}(r_c', \omega)|\Delta x \Delta y} (\rho_h^{bg}(r_c'))^2 \qquad (10)$$

Equation (10) indicates that the anomaly transverse resistance $\rho_h(r_c')\Delta z$ may be estimated from the dipole strength $Idl(r_c',\omega)$, the background response field $E_x^{bg}(r_c',\omega)$, the background resistivity $\rho_h^{bg}(r_c')$, and the horizontal extent $\Delta x \Delta y$ of the sensitive zone 308 for each cmp.

In accordance with an embodiment of the invention, the anomaly transverse resistance (i.e. the transverse resistance of the anomaly) may be computed 408 using the expression of Equation (10). The factors on the right-hand side of Equation (10) may be determined as described above.

Example Application to High Resistive Reservoir

Figure 5:
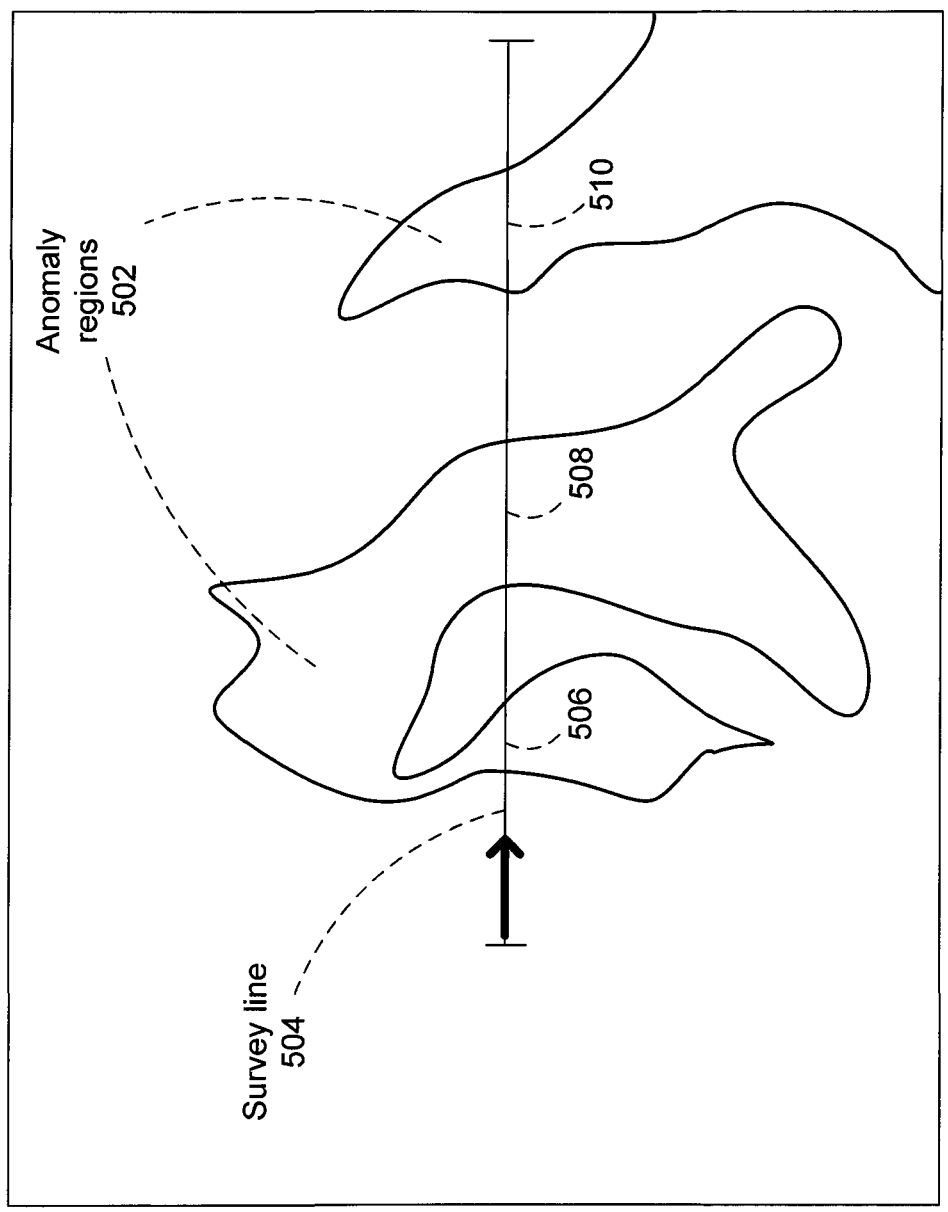
FIG. 5 shows a top view of an actual sea area including approximate outlines of resistive regions under the sea floor in accordance with an embodiment of the invention.

A real world example application of the method 400 of FIG. 4 is now described in relation to FIGS. 5, 6, 7A and 7B. FIG. 5, which is based on real electromagnetic survey data, shows a top view of an actual sea area including approximate outlines of three sub-bottom anomaly regions (resistive regions) 502 under the sea floor. These anomaly regions 502 have resistivities that are substantially higher than the surrounding background sediment. An example of an actual survey line 504 going across the anomaly regions 502 is also depicted.

A vessel traveled along the survey line 504 and used EM surveying apparatus (such as the example apparatus described above in relation to FIG. 1) to acquire 402 EM survey data at periodically spaced apart cmps. As indicated by the arrow, the survey line 504 may be traveled across from left to right in the drawing (i.e. from west to east). As seen in FIG. 5, there are three line segments 506, 508, and 510 of the survey line 504 which are above one of the anomaly regions 502.

Figure 6:
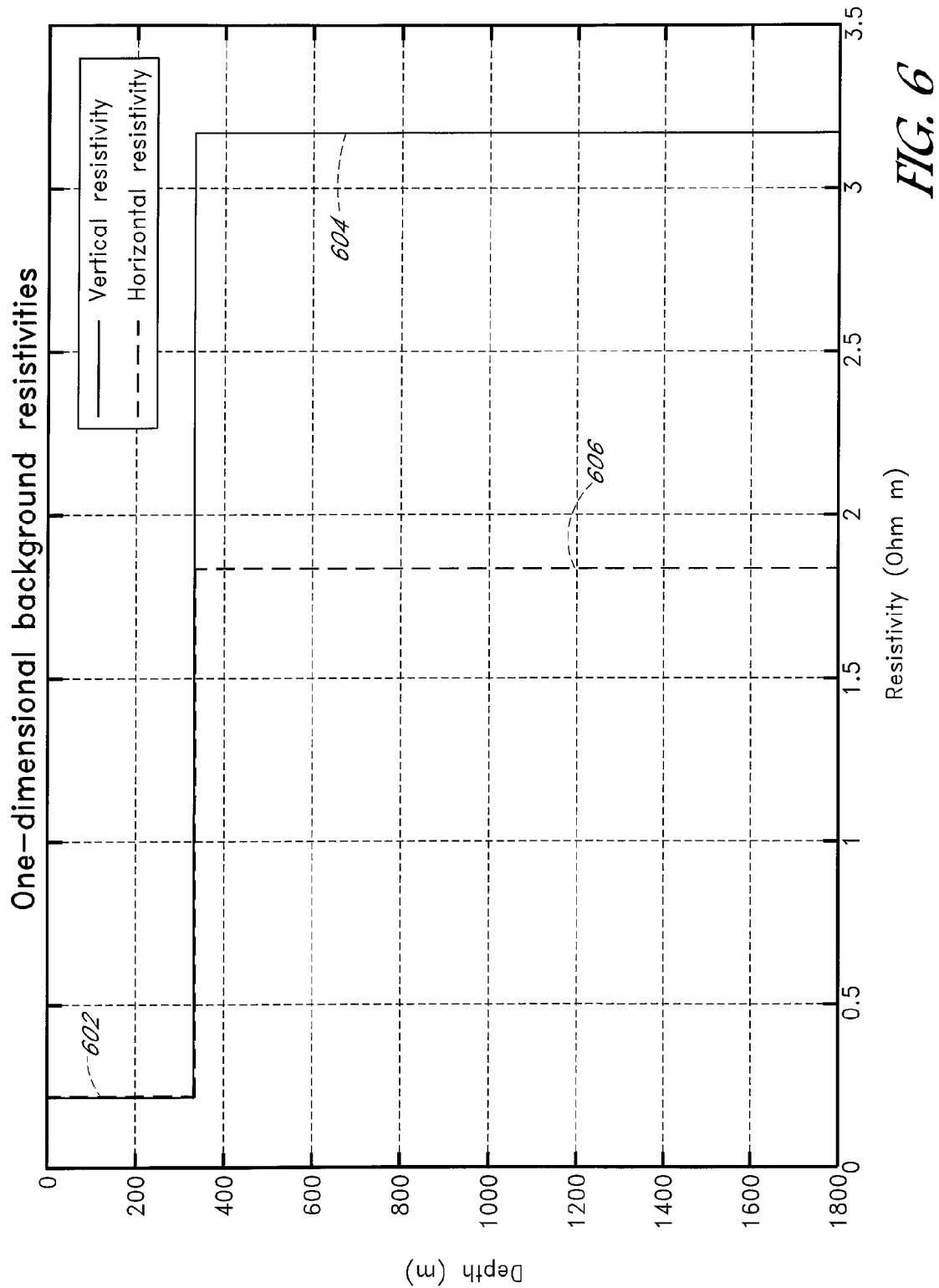
FIG. 6 shows a one-dimensional resistivity background model determined in accordance with an embodiment of the invention.

FIG. 6 is a graph of an example one-dimensional resistivity background model determined 404 in accordance with an embodiment of the invention. The background model in FIG. 6 may be used, for example, for the real-time estimation of the depths and transverse resistances of the anomaly regions 502 as the survey vessel travels along the survey line 504.

In FIG. 6, the vertical axis of the graph shows the depth in meters (m), and the horizontal axis shows the resistivity in Ohm meters (Ohm m). Both the vertical and the horizontal resistivities are graphed. Assuming that the depth of the sea floor is many times greater than the distance between the EM source and EM receiver, the vertical resistivity is a good approximation for the longitudinal resistivity, and the horizontal resistivity is a good approximation for the transverse resistivity.

In this example, the sea floor 304 is approximately 330 meters beneath the sea surface 302. The vertical and horizontal resistivities are set to be a same low resistivity level 602 of approximately 0.25 Ohm meters in the sea water 303 above the sea floor 304.

Beneath the sea floor 304, in the background sediment 310, the vertical and horizontal resistivities are set to have different resistivities. As shown, the vertical resistivity level 604 of the background sediment 310 is determined to be approximately 3.1 Ohm meters, and the horizontal resistivity level 606 of the background sediment 310 is determined to be approximately 1.8 Ohm meters. The resistivity ratio may be defined as the vertical resistivity divided by the horizontal resistivity. Hence, in this example, the resistivity ratio for the water 303 may be determined to be one, while the resistivity ration for the background sediment 310 may be determined to be about 1.7.

Figures 7A, 7B:
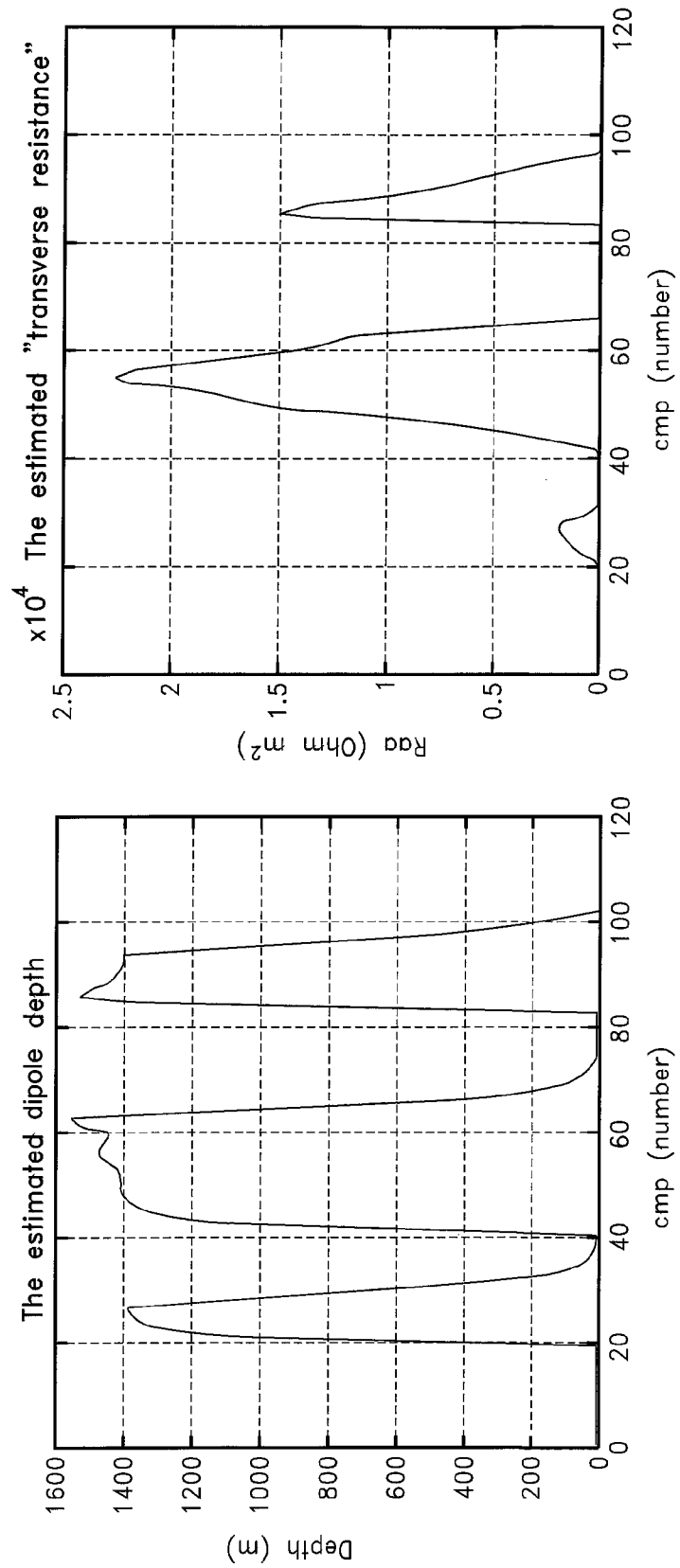
FIG. 7A shows a computed dipole depth along the survey line in accordance with an embodiment of the invention.
FIG. 7B shows transverse resistance of the anomaly regions along the survey line as computed in accordance with an embodiment of the invention.

FIG. 7A shows the dipole depth along the example survey line 504 as determined 406 in accordance with an embodiment of the invention. The vertical axis of the graph shows the depth in meters, and the horizontal axis shows the cmp number. EM data was acquired at 102 cmps during the survey along the example survey line 504. Interpolation may be used to estimate the dipole depth for points in between cmps.

The graph shown in FIG. 7A shows three "peaks" in the estimated dipole depth. Each peak corresponds to one of the three line segments (506, 508, and 510) of the survey line 504 which are above one of the anomaly (resistive) regions 502. As seen by the estimated dipole depth of the peaks, the anomaly regions are indicated to have a center depth of roughly 1,400 meters (m).

FIG. 7B shows transverse resistance of the anomaly regions along the survey line as computed in accordance with an embodiment of the invention. The vertical axis of the graph shows the anomaly transverse resistance in $10^4$ Ohm $m^2$, and the horizontal axis shows the cmp number. Interpolation may be used to estimate the anomaly transverse resistance for points in between cmps.

The graph shown in FIG. 7B shows three "peaks" in the anomaly transverse resistance. Again, each peak corresponds to one of the three line segments (506, 508, and 510) of the survey line 504 which are above one of the anomaly (resistive) regions 502. As seen by the estimated transverse resistance of the peaks, the anomaly transverse resistance is highest for the middle segment 508, lowest for the left segment 506, and in between for the right segment 510. Assuming a same high-resistivity substance throughout the anomaly regions 502, it may be inferred from this result that the high-resistivity anomaly is thickest under the middle segment 508, least thick under the left segment 506, and of in between thickness under the right segment 510. This is because, per the left side of Equation (10), the anomaly transverse resistance is proportional to the vertical extent (i.e. the height) $\Delta z$ of the sensitive zone 308.

Advantageously, the computations to obtain the results shown in FIGS. 7A and 7B may be performed very rapidly. An implementation using a laptop computer (with a dual core processor and 6 gigabytes of RAM) performed the computations for all 102 cmps in about 20 seconds. Hence, the computations for each cmp were performed in only about 0.2 seconds. The rapid speed of these computations enable the target depth and transverse resistance to be estimated in real time as the EM survey data is acquired by the vessel. Such real-time computations of target depth and transverse resistance enable adjustments to be made dynamically to the survey plan while the survey is being performed. For example, the survey plan may be changed to explore in further detail a target region that appears to have a particularly promising subsurface formation based on the real-time depth and resistance information.

Figure 8:
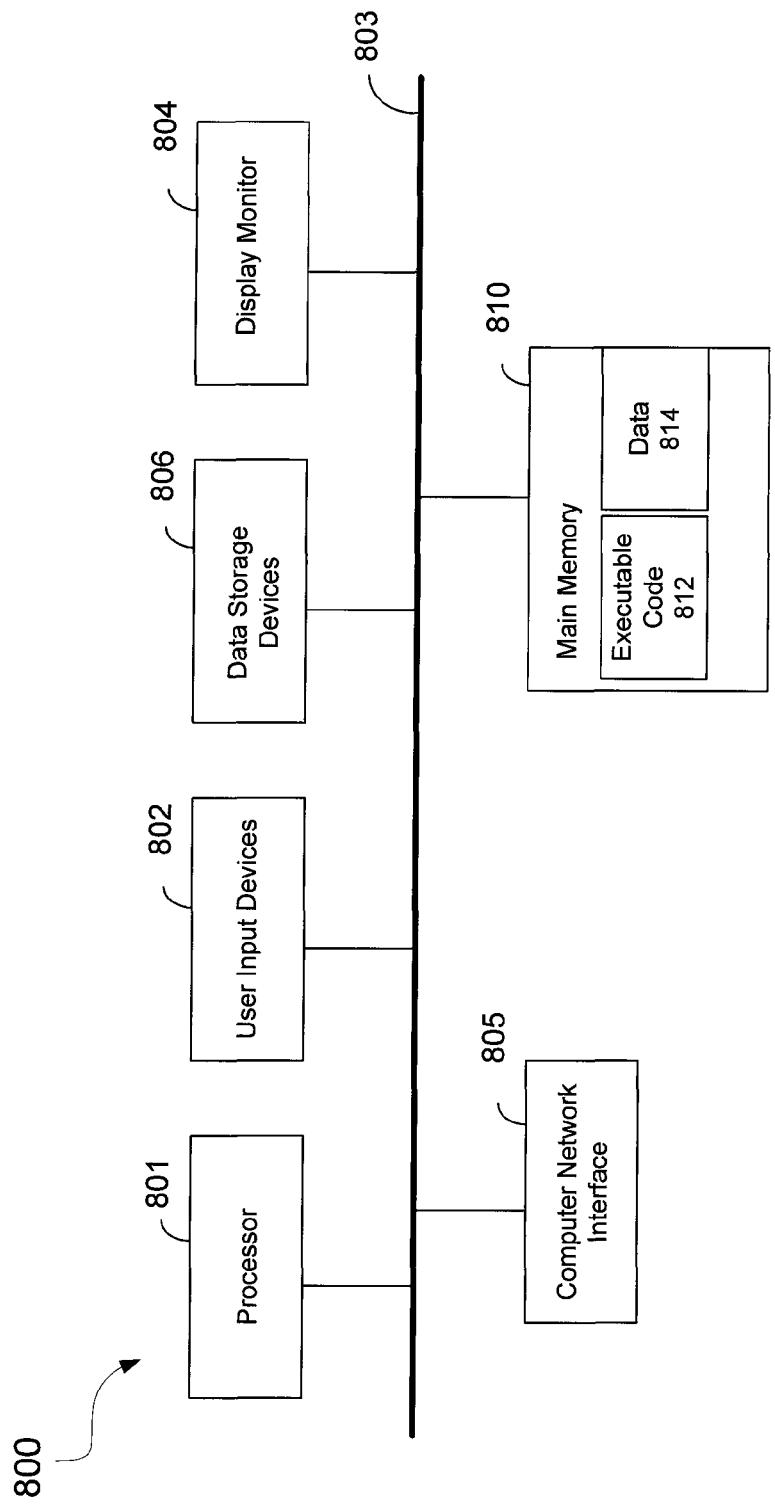
FIG. 8 is a high-level diagram showing an example computer apparatus in accordance with an embodiment of the invention.

FIG. 8 is a high-level diagram of an example computer apparatus 800 in accordance with an embodiment of the invention. The computer apparatus 800 may be configured with executable instructions so as to perform the data processing methods described herein. This figure shows just one example of a computer which may be used to perform the data processing methods described herein. Many other types of computers may also be employed, such as multi-processor computers, server computers, cloud computing via a computer network, and so forth.

The computer apparatus 800 may include a processor 801, such as those from the Intel Corporation of Santa Clara, Calif., for example. The computer apparatus 800 may have one or more buses 803 communicatively interconnecting its various components. The computer apparatus 800 may include one or more user input devices 802 (e.g., keyboard, mouse), one or more data storage devices 806 (e.g., hard drive, optical disk, USB memory), a display monitor 804 (e.g., LCD, flat panel monitor, CRT), a computer network interface 805 (e.g., network adapter, modem), and a main memory 810 (e.g., RAM).

In the example shown in this figure, the main memory 810 includes executable code 812 and data 814. The executable code 812 may comprise computer-readable program code (i.e., software) components which may be loaded from the data storage device 806 to the main memory 810 for execution by the processor 801. In particular, the executable code 812 may be configured to perform the data processing methods described herein.

In conclusion, the present disclosure provides a fast and efficient technique for estimating the depth and transverse resistance of resistive anomaly regions below the sea floor. The technique may use real-time processed frequency responses from at least one cmp. A background resistivity model is determined. An inversion procedure is used to determine the depth and transverse resistance of a resistive region based, at least in part, on the change in the frequency response when moving from one cmp that is above background sediment to another cmp that is above the resistive region. A map of the survey area showing the depth and transverse resistance (or vertical extent) may then be generated by mapping the results for an array of cmps.

In an application of particular interest, the resistivity of a sub-bottom resistive region (i.e. the anomaly region) may be substantially higher than a resistivity of the background material. Such a sub-bottom resistive region may be indicative of an oil and/or gas deposit underneath the sea floor.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method implemented using at least one computer for determining characteristics of a target region which is embedded in background material below a body of water, the method comprising:
    obtaining data representative of characteristics of an electric dipole of the target region, wherein the data was produced by an electromagnetic survey comprising transmitting a source electromagnetic signal from an antenna to the target region, and using electromagnetic sensors to detect electromagnetic fields responsive to the source electromagnetic signal;
    determining a resistivity background model using a first inversion procedure that minimizes a first objective function, wherein the first objective function includes a difference between a calculated response field based on a one-dimensional resistivity background model and a measured electric field for a common midpoint that is not above the target region;
    determining, from the data, the characteristic of the electric dipole of the target region; and
    computing a resistance for the target region using the characteristics of the dipole and the resistivity background model.

2. The method of claim 1, wherein determining the resistivity background model comprises determining a one-dimensional resistivity background model.

3. The method of claim 2, wherein the one-dimensional resistivity background model includes a first resistivity level for water in the body of water, a second resistivity level for a vertical resistivity of the background material, and a third resistivity level for a horizontal resistivity of the background material.

4. The method of claim 1, wherein the characteristics of the dipole comprise a dipole depth and a dipole strength.

5. The method of claim 4, wherein the dipole depth and the dipole strength are determined using a second inversion procedure that minimizes a second objective function.

6. The method of claim 5, wherein the second objective function comprises a square of a difference in strengths of a calculated response field based on the resistivity background model and the characteristics of the dipole and a measured response field.

7. The method of claim 1, wherein the resistance comprises a transverse resistance.

8. The method of claim 7, wherein the transverse resistance indicates a vertical extent of the target region.

9. The method of claim 1, wherein a resistivity of the target region is substantially higher than a resistivity of the background material.

10. The method of claim 1, wherein the method is performed in less than 0.5 seconds.

11. An apparatus configured to determine characteristics of a target region which is embedded in background material below a body of water, the apparatus comprising:
    an antenna for transmitting a source electromagnetic signal to the target region;
    electromagnetic sensors for detecting electromagnetic fields responsive to the source electromagnetic signal;
    memory configured to store computer-readable code and data;
    a processor configured to execute the computer-readable code so as to process and modify the data; and
    computer-readable code configured to determine a resistivity background model using a first inversion procedure that minimizes a first objective function, wherein the first objective function includes a difference between a calculated response field based on a one-dimensional resistivity background model and a measured electric field for a common midpoint that is not above the target region, determining characteristics of an electric dipole in the target region using a second inversion procedure that minimizes a second objective function, wherein the second objective function comprises a square of a difference in strength of a calculated response field based on the resistivity background model and the characteristics of the dipole and a measured response field, and compute a resistance for the target region using the characteristics of the dipole and the resistivity background model.

12. The apparatus of claim 11, wherein the resistivity background model is based on a one-dimensional resistivity background model.

13. The apparatus of claim 12, wherein the one-dimensional resistivity background model includes a first resistivity level for water in the body of water, a second resistivity level for a vertical resistivity of the background material, and a third resistivity level for a horizontal resistivity of the background material.

14. The apparatus of claim 11, wherein the characteristics of the dipole comprise a dipole depth and a dipole strength.

15. The apparatus of claim 11, wherein the resistance comprises a transverse resistance.

16. The apparatus of claim 15, wherein the transverse resistance indicates a vertical extent of the target region.

17. A method of performing an electromagnetic survey, the method comprising:
    generating an electromagnetic signal using an antenna, wherein the electromagnetic signal is imparted to a sub-bottom resistive region which is embedded in background material below a body of water;
    receiving an electromagnetic response using a plurality of sensors, wherein the electromagnetic response is responsive to the electromagnetic signal; and
    using data processing apparatus to determine, in real-time during the electromagnetic survey, characteristics of the sub-bottom resistive region,
    wherein the data processing apparatus determines the characteristics of the sub-bottom resistive region by determining a resistivity background model using a first inversion procedure that minimizes a first objective function, wherein the first objective function includes a difference between a calculated response field based on a one-dimensional resistivity background model and a measured electric field for a common midpoint that is not above the sub-bottom resistive region, determining characteristics of an electric dipole in the sub-bottom resistive region using a second inversion procedure that minimizes a second objective function, wherein the second objective function comprises a square of a difference in strength of a calculated response field based on the resistivity background model and the characteristics of the dipole and a measured response field, and computing a resistance for the sub-bottom resistive region using the characteristics of the dipole and the resistivity background model.

18. The method of claim 17, further comprising:
    dynamically adjusting a survey plan based on the characteristics of the sub-bottom resistive region.

* * * * *